(12) United States Patent
Schwalbe et al.

(10) Patent No.: US 11,076,524 B2
(45) Date of Patent: Aug. 3, 2021

(54) BOOM CENTER SECTION WITH BULKHEAD CONNECTIONS

(71) Applicant: CNH Industrial America LLC, New Holland, PA (US)

(72) Inventors: Blaine A. Schwalbe, Valders, WI (US); Brian J. Pilney, West Bend, WI (US)

(73) Assignee: CNH Industrial America LLC, New Holland, PA (US)

( * ) Notice: Subject to any disclaimer, the term of this patent is extended or adjusted under 35 U.S.C. 154(b) by 782 days.

(21) Appl. No.: 15/806,835

(22) Filed: Nov. 8, 2017

(65) Prior Publication Data
US 2019/0133021 A1 May 9, 2019

(51) Int. Cl.
| | |
|---|---|
| *F16L 37/00* | (2006.01) |
| *A01B 59/06* | (2006.01) |
| *A01B 63/02* | (2006.01) |
| *B05B 13/00* | (2006.01) |
| *B05B 15/65* | (2018.01) |
| *A01M 7/00* | (2006.01) |
| *A01B 59/00* | (2006.01) |

(52) U.S. Cl.
CPC ............ *A01B 59/064* (2013.01); *A01B 59/00* (2013.01); *A01B 63/02* (2013.01); *A01M 7/0053* (2013.01); *B05B 13/005* (2013.01); *B05B 15/65* (2018.02); *F16L 37/00* (2013.01)

(58) Field of Classification Search
CPC ....... A01B 59/064; A01B 59/00; A01B 63/02; A01M 7/0053; A01M 7/005; B05B 15/65; B05B 13/005; F16L 37/00; F16L 5/04; A01D 67/00; B60R 16/08
See application file for complete search history.

(56) References Cited

U.S. PATENT DOCUMENTS

| | | | |
|---|---|---|---|
| 4,946,102 A | 8/1990 | DeWitt et al. | |
| 5,984,371 A * | 11/1999 | Mailleux | E02F 3/3654 285/26 |
| 7,258,369 B2 * | 8/2007 | Martin | F16L 37/18 285/124.5 |
| 7,503,591 B2 | 3/2009 | Beeren et al. | |
| 7,597,361 B2 | 10/2009 | Thelien | |
| 8,323,240 B2 | 12/2012 | Stone | |
| 8,585,098 B2 * | 11/2013 | Lundgren | E02F 3/3654 285/124.4 |
| 9,096,990 B2 | 8/2015 | Sayre et al. | |
| 2002/0096879 A1 * | 7/2002 | Liao | F16L 37/56 285/124.1 |
| 2006/0163381 A1 | 7/2006 | Balmer | |
| 2013/0134702 A1 * | 5/2013 | Boraas | |
| 2015/0173343 A1 * | 6/2015 | Danes | A01M 7/0053 239/168 |
| 2016/0131294 A1 | 5/2016 | Lind et al. | |
| 2016/0316737 A1 * | 11/2016 | Pilney | A01C 23/008 |
| 2017/0055514 A1 | 3/2017 | Lawrence | |

* cited by examiner

*Primary Examiner* — Matthew Troutman
*Assistant Examiner* — James A Linford
(74) *Attorney, Agent, or Firm* — Rebecca L. Henkel; Rickard K. DeMille

(57) ABSTRACT

A boom center section for an agricultural machine includes a bulkhead having a first end and a second end, at least one bulkhead opening located adjacent at least one of the first and the second ends of the bulkhead, and at least one connection assembly disposed within the at least one bulkhead opening. Each bulkhead opening is formed through a first wall of the bulkhead. Each connection assembly includes a plurality of connectors.

6 Claims, 6 Drawing Sheets

BOOM CENTER SECTION WITH BULKHEAD CONNECTIONS

FIELD OF THE INVENTION

The invention relates generally to agricultural product application equipment such as self-propelled sprayers and, in particular, to a boom of including bulkhead connections, each of which has a group of quick connection fittings or connectors at a single location.

BACKGROUND OF THE INVENTION

High-clearance spreaders are getting more complex and more versatile. A single sprayer can be used with booms of different sizes and configurations. Recently, sprayers have been adapted to use various non-application accessories for performing non-application agricultural tasks like swathing, detassling, or other accessories that can be supported by a toolbar.

Changing booms or adapting to non-application accessories requires removing the boom or accessory toolbar, which can be challenging because of the numerous hose connections, line connections, and electrical connections made between the sprayer and the boom or accessory toolbar. These connections locations are often at brackets on the sprayer lift arms, in positions that may be difficult to reach and may require an operator to walk under the boom arms to connect and disconnect. Once disconnected, the hoses, lines, and electrical wires or harnesses on the removed boom or accessor toolbar can be difficult to stow away or otherwise manage because of their long unsupported lengths needed to reach the connection at the lift arms.

Therefore, a need exists for an improved system that provides specific locations for connections of the different hoses, lines, and electrical connections central located and easy to access. In addition, there is a need for the connections to be quick connectors to allow easy attachment and removal of the different hoses, lines, and electrical connections.

SUMMARY OF THE INVENTION

The present invention is directed to a boom of an agricultural sprayer including bulkhead connections, each of which has a group of quick connection fittings at a single location.

According to one aspect of the invention, a boom center section for an agricultural machine includes a bulkhead having a first end and a second end, at least one bulkhead opening located adjacent at least one of the first and the second ends of the bulkhead, and at least one connection assembly disposed within the at least one bulkhead opening. Each bulkhead opening is formed through a first wall of the bulkhead. Each connection assembly includes a plurality of connectors.

In accordance with another aspect of the invention, the at least one bulkhead opening includes a first bulkhead opening located in a first portion of the bulkhead adjacent the first end of the bulkhead and a second bulkhead opening located in a second portion of the bulkhead adjacent the second end of the bulkhead. The at least one connection assembly includes a first connection assembly disposed within the first bulkhead opening and including a plurality of connectors and a second connection assembly disposed within the second bulkhead opening and including a plurality of connectors.

In accordance with yet another aspect of the invention, the plurality of connectors of the at least one connection assembly includes at least one of hydraulic connections, electrical connections, pneumatic connections, and product connections. In addition, the plurality of connectors may be quick connect fittings.

In accordance with another aspect of the invention, each connection assembly includes a plurality of walls surrounding a cavity. The connectors of the connection assembly are disposed within the cavity.

In accordance with yet another aspect of the invention, the plurality of walls of the connection assembly form a perimeter of the connection assembly. The perimeter of the connection assembly matches a perimeter of its respective bulkhead opening.

In accordance with another aspect of the invention a rear wall of the bulkhead includes a plurality of orifices aligned with the plurality of connectors of the at least one connection assembly. Each connector extends through a respective orifice and is suspended within a respective connection assembly.

In accordance with yet another aspect of the invention, a rear wall of the bulkhead is coupled to the agricultural sprayer by way of a plurality of lift arms.

According to another aspect of the invention, a method of manufacturing a boom centers section includes providing a bulkhead having a first wall, a second wall, a first end, and a second end, forming at least one bulkhead opening through the first wall of the bulkhead in a location adjacent at least one of the first and the second ends, and disposing a connection assembly within each of the at least one bulkhead opening. The at least one connection assembly including a plurality of connectors, and the plurality of connectors are quick connect fittings.

In accordance with yet another aspect of the invention, forming at least one bulkhead opening includes forming a first bulkhead opening through the first wall of the bulkhead in a location adjacent the first end of the bulkhead and forming second bulkhead opening through the first wall of the bulkhead in a location adjacent the second end of the bulkhead. Disposing a connection assembly within each of the at least one bulkhead opening includes disposing a first connection assembly within the first bulkhead opening and disposing a second connection assembly within the second bulkhead opening.

In accordance with another aspect of the invention, the plurality of connectors of the first connection assembly includes at least one of hydraulic connectors and electrical connectors. Meanwhile, the plurality of connectors of the second connection assembly includes at least one of pneumatic connectors and product connectors.

In accordance with yet another aspect of the invention, each connection assembly is formed by surrounding a cavity with a plurality of walls surrounding a cavity and disposing the plurality of connectors within the cavity.

In accordance with another aspect of the invention, surrounding the cavity with the plurality of walls creates a perimeter of the connection assembly. The perimeter of the connection assembly matches a perimeter of its respective bulkhead opening.

In accordance with yet another aspect of the invention, the method includes forming a plurality of orifices through a rear wall of the bulkhead, disposing each of the plurality of connectors of the respective connection assembly within a respective orifice, and suspending each of the plurality of connectors within the connection assembly.

According to yet another aspect of the invention, a boom center section for an agricultural machine includes a bulkhead having a front wall, a rear wall, a left portion, a center portion, and a right portion, a first bulkhead opening formed through the front wall of the bulkhead in the left portion of the bulkhead, a second bulkhead opening formed through the front wall of the bulkhead in the right portion of the bulkhead, a first connection assembly disposed within the first bulkhead opening, and a second connection assembly disposed within the second bulkhead opening. The first connection assembly includes a plurality of walls surrounding a cavity and a plurality of connectors disposed within the cavity. Similarly, the second connection assembly includes a plurality of walls surrounding a cavity and a plurality of connectors disposed within the cavity.

In accordance with another aspect of the invention, the plurality of connectors of the first connection assembly include at least one of hydraulic connectors and electrical connectors. The plurality of connectors of the second connection assembly include at least one of pneumatic connectors and product connectors. Further, the fittings or connectors of the plurality of connectors may be quick connect fittings.

In accordance with yet another aspect of the invention, the plurality of walls of the first connection assembly form a perimeter of the first connection assembly, and the perimeter of the first connection assembly matches a perimeter of its first bulkhead opening. Similarly, the plurality of walls of the second connection assembly form a perimeter of the second connection assembly, and the perimeter of the second connection assembly matches the perimeter of the second bulkhead opening.

In accordance with another aspect of the invention, the boom center section also includes a first plurality of orifices and a second plurality of orifices formed through the rear wall of the bulkhead. The first plurality of orifices is aligned with the cavity of the first connection assembly, and the second plurality of orifices is aligned with the cavity of the second connection assembly. Each of the plurality of connectors of the first connection assembly are disposed within a respective orifice of the first plurality of orifices. Likewise, each of the plurality of connectors of the second connection assembly are disposed within a respective orifice of the second plurality of orifices.

In accordance with yet another aspect of the invention, the plurality of connectors of the first connection assembly are suspended within the cavity of the first connection assembly and extend through the first plurality of orifices and beyond the rear wall of the bulkhead. Similarly, the plurality of connectors of the second connection assembly are suspended within the cavity of the second connection assembly and extend through the second plurality of orifices and beyond the rear wall of the bulkhead.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
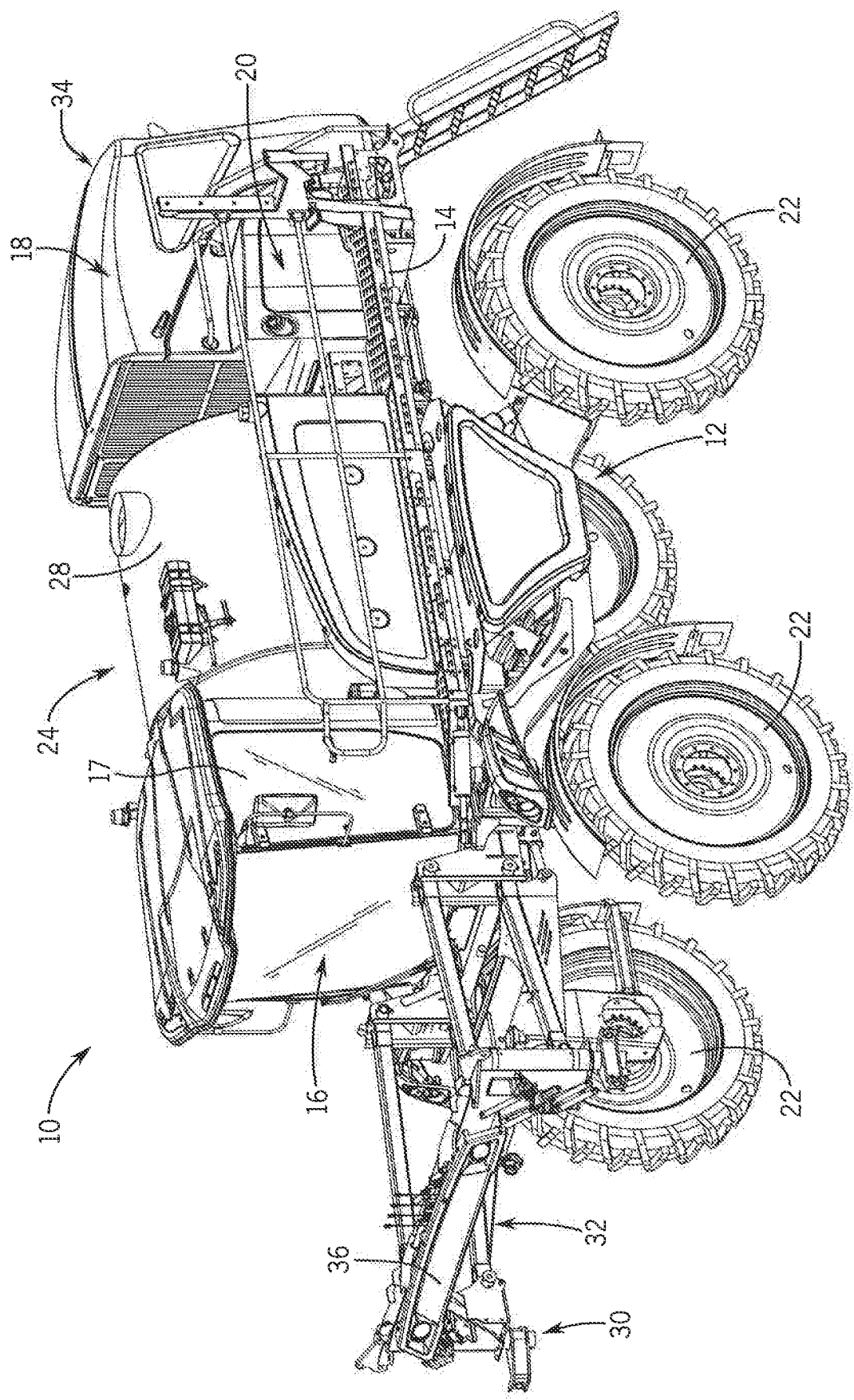
FIG. 1 is an isometric view of an agricultural machine.

Referring now to the drawings and specifically to FIG. 1, aspects of the invention are shown for use with an agricultural machine, for example, but not limited to, an agricultural sprayer. The agricultural sprayer is shown here as a self-propelled agricultural sprayer vehicle or self-propelled sprayer 10. Although the sprayer 10 is shown as a front-mounted boom self-propelled sprayer, it is understood that self-propelled versions of the sprayer 10 can have either front-mounted or rear-mounted booms, such as those available from CNH Industrial, including the Miller Nitro and Condor Series sprayers, and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18, an engine accessory system 34, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank 26 for storing water or a rinsing solution and a product tank 28 for storing a volume of product for delivery onto an agricultural field with the sprayer 10. A product delivery pump can convey product from the product tank. 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to move the boom 30 up and down for adjusting the height of application of the product.

Figure 2:
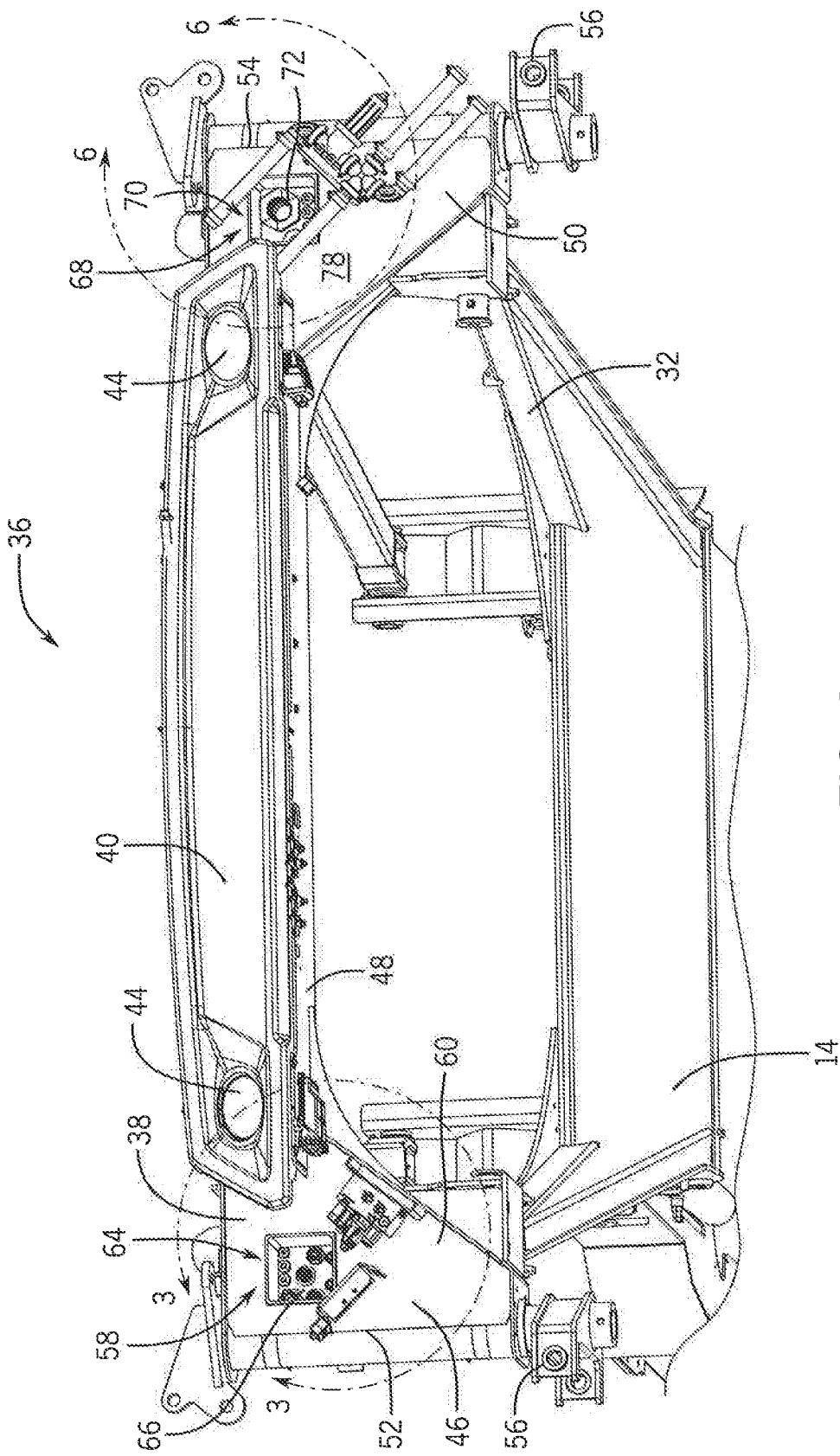
FIG. 2 is an isometric view of a boom center section of the agricultural sprayer.

FIG. 2 depicts a perspective view of the front of the sprayer 10, including the boom 30 and the lift arm assembly 32. The boom 30 includes a boom center section 36 coupled to the lift arm assembly 32. The boom center section 36 includes a bulkhead 38 and a center cover 40 extending from a front surface 42 of the bulkhead 38. In varying embodiments of the invention, the center cove 40 may include a number of components, such as, but not limited to, the headlights 44 shown in FIG. 2.

The bulkhead 38 includes a left portion 46, a center portion 48 disposed directly behind the center cover 40, and a right portion 50. The left portion 46 of the bulkhead 38 is adjacent a first end 52 of the bulkhead 38. Similarly, the right portion 50 of the bulkhead 38 is adjacent the second end 54 of the bulkhead 38. Boom connections 56 are shown as lower brackets disposed at the first and second ends 52 of the bulkhead and provide for the structural connection or joint between the boom center section 36 and the boom other boom segments, such as primary boom segments that extend from the boom center section and may support other boom segments that collectively form the boom 30.

Figure 5:
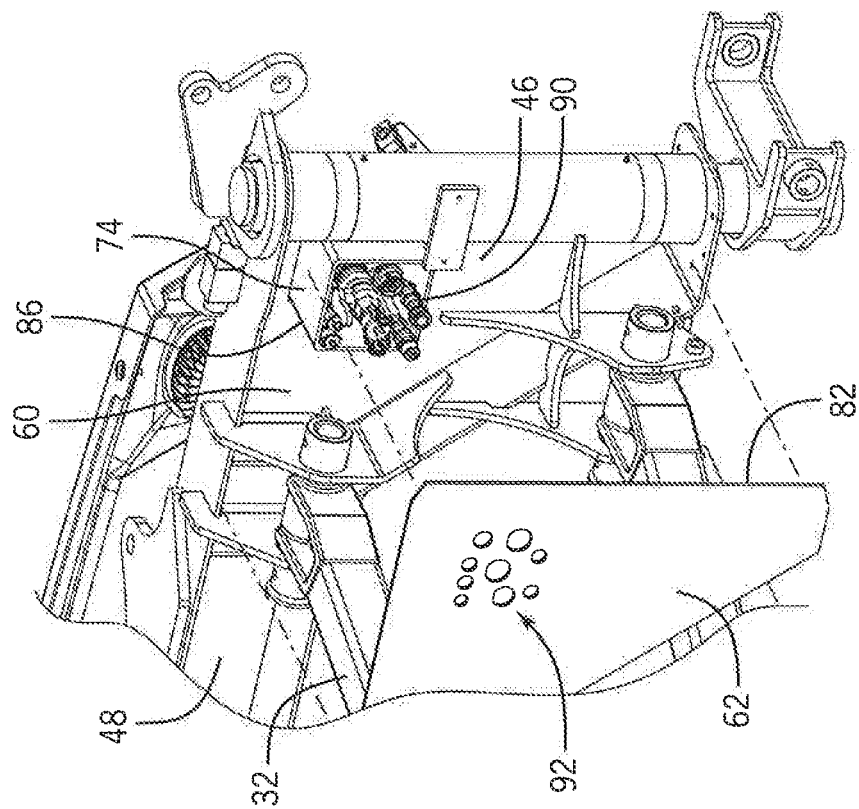
FIG. 5 is a rear exploded isometric view of the boom center section of FIG. 3.

The bulkhead 38 may include a first bulkhead opening 58 disposed in the left portion 46 of the bulkhead 38. In the representative embodiment of the invention, the bulkhead 38 is a box plate structure with a front wall 60 and a rear wall 62. That is, the first bulkhead opening 58 includes an orifice 64 formed in the front wall 60 of the bulkhead 38. A first connection assembly 66, which will be described in further detail with respect to FIGS. 3-5, is disposed within the first bulkhead opening 58.

Figure 6:
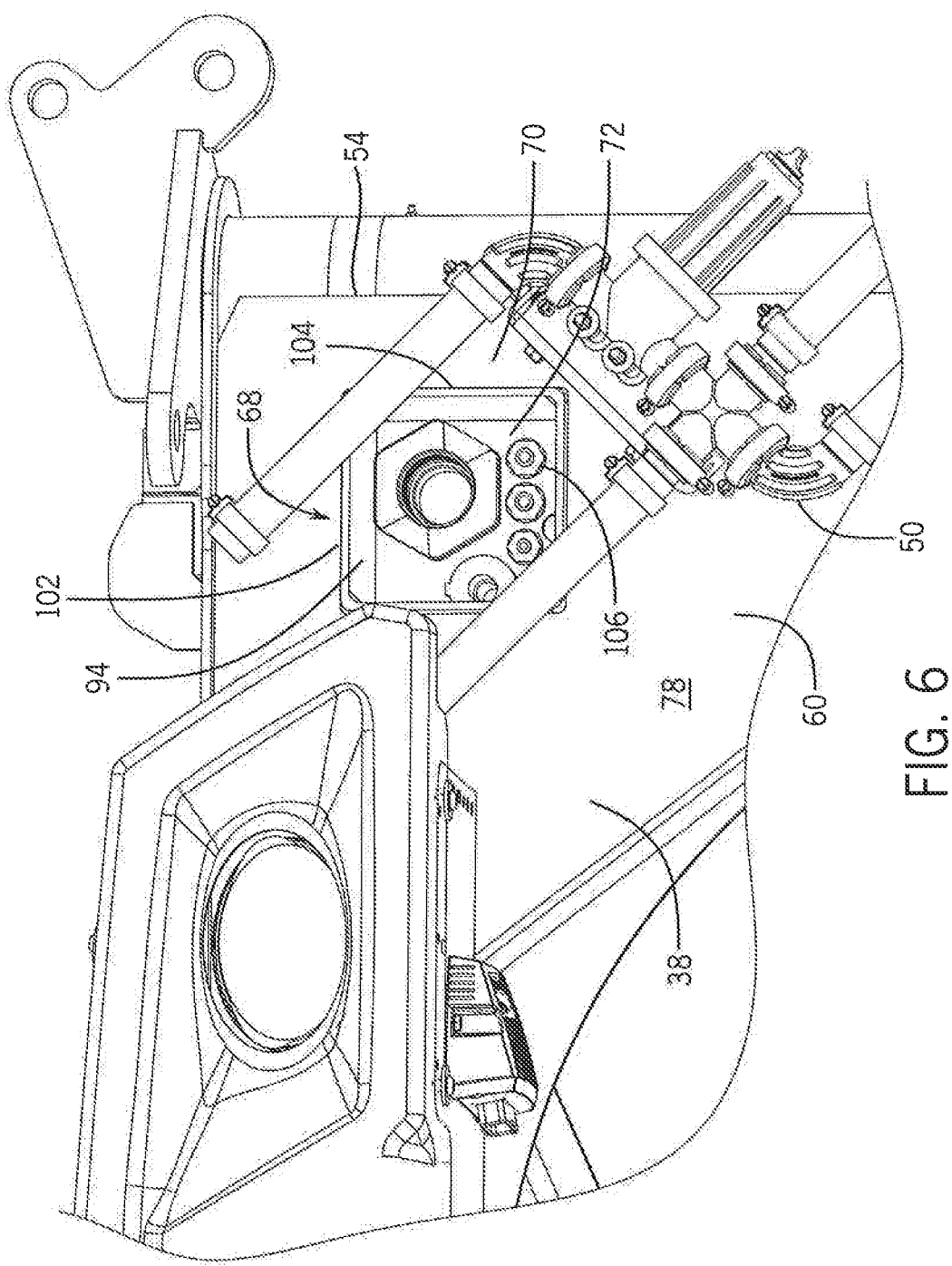
FIG. 6 is an enlarged view of section 9-9 of the boom center section of FIG. 2.
Figure 7:
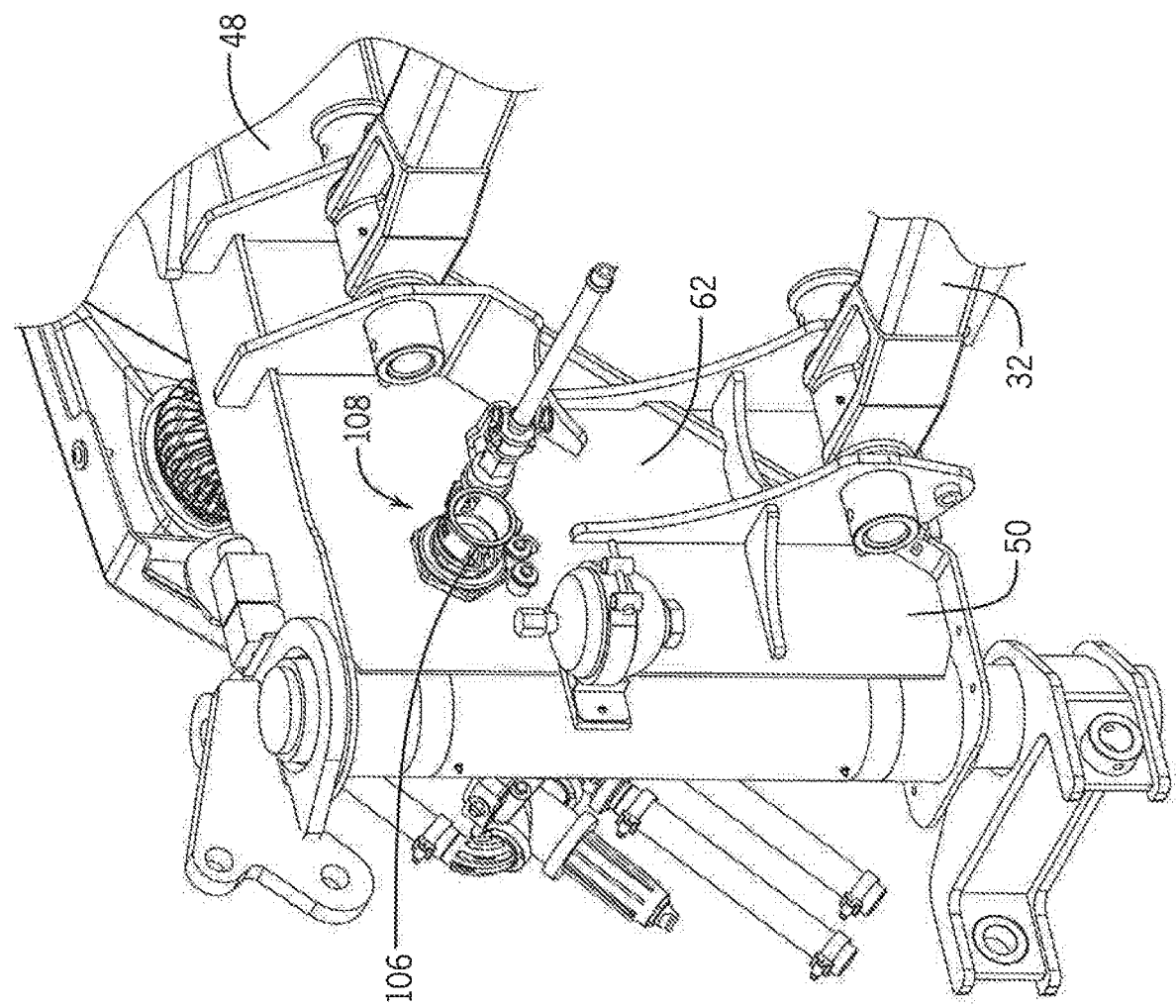
FIG. 7 is a rear isometric view of the boom center section of FIG. 6.

The bulkhead 38 may also include a second bulkhead opening 68 disposed in the right portion 50 of the bulkhead 38. Similar to the first bulkhead opening 58, the second bulkhead opening 68 includes an orifice 70 formed in the front wall 60 of the bulkhead 38. A second connection assembly 72, which will be described in further detail with respect to FIGS. 6 and 7, is disposed within the second bulkhead opening 68.

Figure 3:
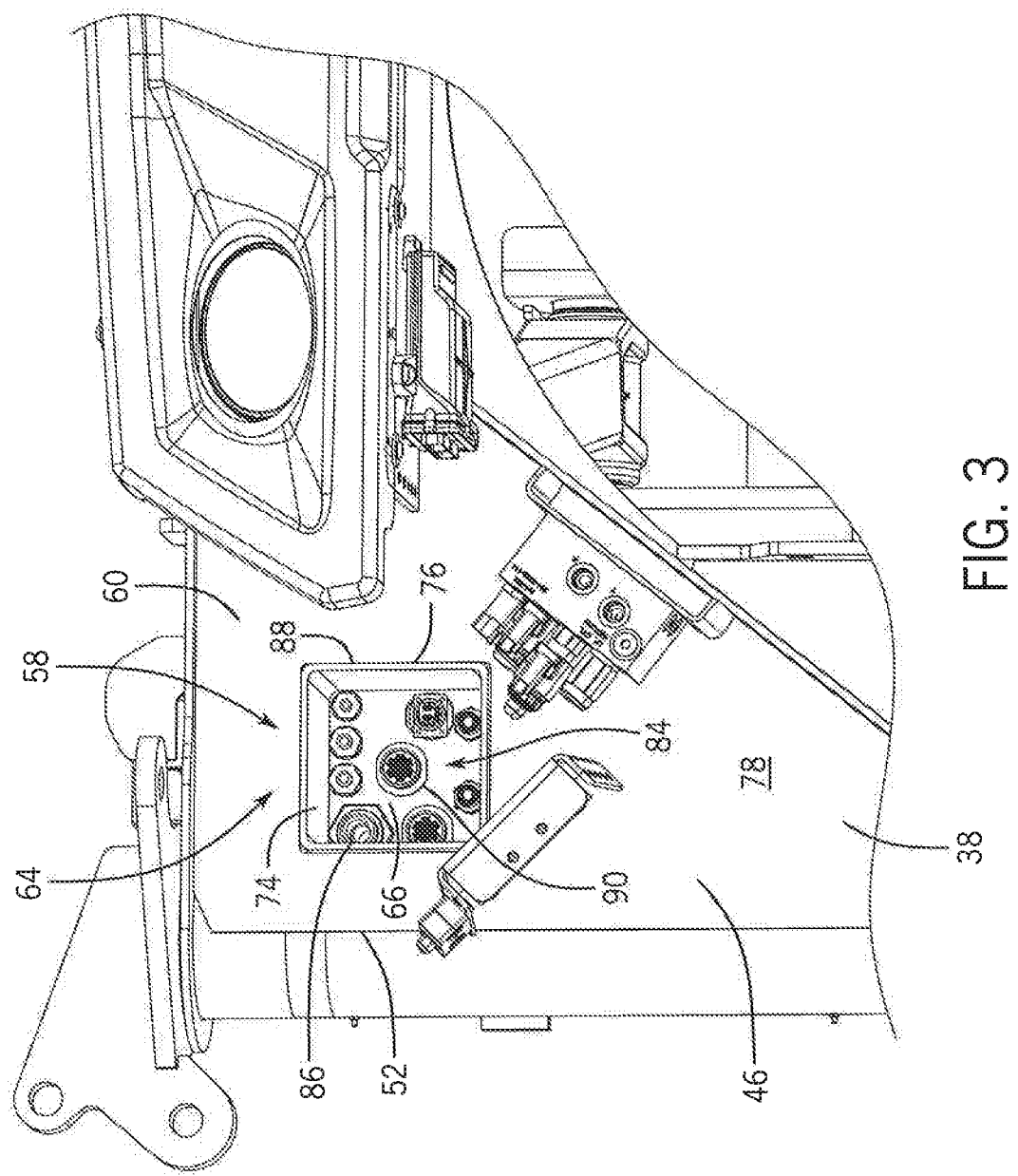
FIG. 3 is an enlarged view of section 3-3 of the boom center section of FIG. 2.
Figure 4:
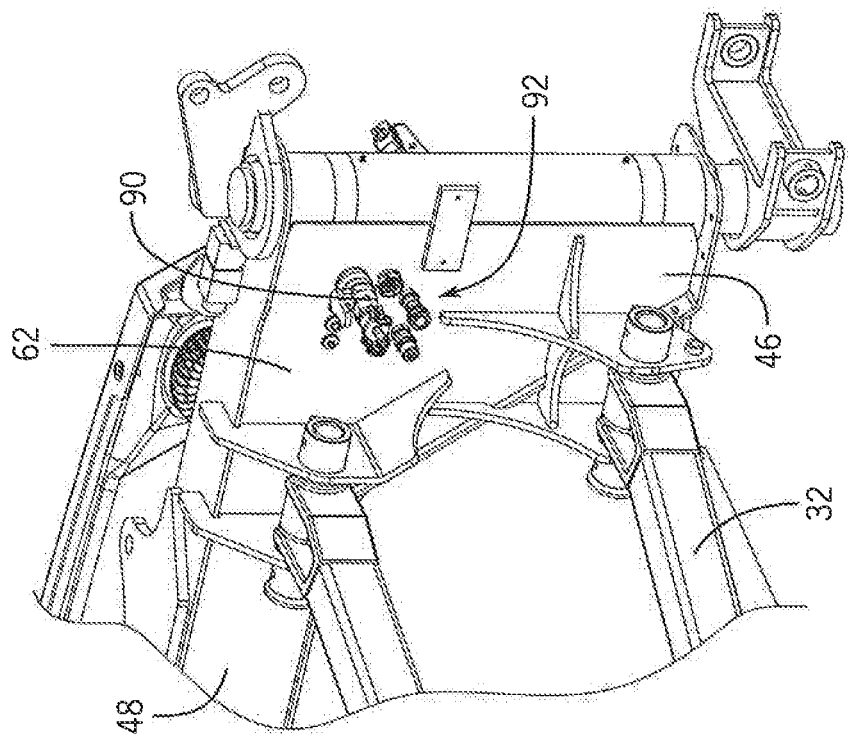
FIG. 4 is a rear isometric view of the boom center section of FIG. 3.

Now referring to FIG. 3, an enlarged view of the left portion 46 of the bulkhead 38 is shown to further illustrate the first bulkhead opening 58 and first connection assembly 66. The first connection assembly 66 includes a plurality of walls 74 extending from a first end 76 aligned with an outer surface 78 of the front wall 60 of the bulkhead 38—aligned with the front surface 42 of the bulkhead 38—to a second end 80 aligned with an inner surface 82 of the rear wall 62 of the bulkhead 38. The plurality of walls 74 surround a cavity 84 within the first connection assembly 66. The walls 74 of the first connection assembly 66 form a perimeter 86 of the first connection assembly 66 that matches a perimeter 88 of the first bulkhead opening 58.

The first connection assembly 66 further includes a plurality of fittings or connectors such as connectors 90 disposed within the cavity 84. In the representative embodiment of the invention, the connectors 90 are quick connects to allow a user to quickly and easily connect and disconnect components from the connectors 90. The connectors 90 may be mounted to a bulkhead connection support wall that is arranged transversely within the cavity 84, such as by threaded collars or other mounting configurations that allow the connectors 90 to be secured within and extend through openings in the bulkhead connection support wall. However, in other embodiments of the invention, the connectors 90 may be other types of connections or connectors known in the art. Further according to one embodiment of the invention, the connectors 90 may include, but are not limited to, electrical connectors and hydraulic connectors. In this way, regardless of the particular type(s) of connectors 90, the first connection assembly 66 provides a coupling arrangement for the respective boom components to corresponding sprayer machine components at that location on the boom center section, itself.

FIGS. 4 and 5 illustrate rear views of the left portion 46 of the bulkhead 38 to further illustrate the plurality of connectors 90. In FIG. 4, the plurality of connectors 90 are shown extending through the rear wall 62 of the bulkhead 38. In FIG. 5, which depicts an exploded isometric view, the rear wall 62 is shown as including a plurality of openings or orifices 92 formed therethrough, Each orifice 92 is aligned with a respective connector 90 and allows the connector 90 to extend from within the cavity 84 of the first connection assembly 66 to beyond the rear wall 62 of the bulkhead 38. Further, each connector 90 is coupled to its respective orifice 92 and suspended within the cavity 84 of the first connection assembly 66.

Next, FIG. 6 depicts an enlarged view of the fright portion 50 of the bulkhead 38 and further illustrates the second bulkhead opening 68 and the second connection assembly 72. Similar to the first connection assembly 66, the second connection assembly 72 includes a plurality of walls 94 extending from a first end 96 aligned with the outer surface 78 of the front wall 60 of the bulkhead 38—aligned with the front surface 42 of the bulkhead 38—to a second end 98 aligned with the inner surface 82 of the rear wall 62 of the bulkhead 38. The second connection assembly 72 also includes a cavity 100 surrounded by the walls 94. In addition, the walls 94 of the second connection assembly 72 form a perimeter 102 of the second connection assembly 72 that matches a perimeter 104 of the second bulkhead opening 68.

The second bulkhead opening 72 also includes a plurality of fittings or connectors, such as connectors 106 suspended within the cavity 100, which will be described further below. It is contemplated that the connectors 106 may be quick connects to allow a user to quickly and easily connect and disconnect components from the connectors 106. The connectors 106 may be mounted to a bulkhead connection support wall that is arranged transversely within the cavity 100, such as by threaded collars or other mounting configurations that allow the connectors 106 to be secured within and extend through openings in the bulkhead connection support wall. In other embodiments of the invention, the connectors 106 may be other types of connections or connectors known in the art. In addition, the connectors 106 may include, but are not limited to, pneumatic connectors and product connectors. Like with the first connection assembly 66, regardless of the particular type(s) of connectors 106, the second connection assembly 72 provides a coupling arrangement for the respective boom components to corresponding sprayer machine components at that location on the boom center section, itself.

FIG. 7 illustrates a rear view of the right portion 50 of the bulkhead 38 to further illustrate the plurality of connectors 106. The rear wall 62 includes a plurality of orifices 108 formed therethrough and aligned with the plurality of connectors 106. Each orifice 108 aligns with a respective connection 106 and allows the connection 106 to extend from within the cavity 100 of the second connection assembly 72 to beyond the rear wall 62 of the bulkhead 38. Each connection 106 is also coupled to its respective orifice 108 and suspended within the cavity 100 of the second connection assembly 72.

FIGS. 4, 5, and 7 also depict the connection of the lift arm assembly 32 to the boom center section 36. That is, the lift arm assembly 32 is coupled to the rear wall 62 of the bulkhead 38 of the boom center section 36 at the left and right portions 46, 50 of the bulkhead 38.

While the first connection assembly 66 is described above as including electrical connectors and hydraulic connectors and the second connection assembly 72 is described as including pneumatic connectors and product connectors, it is contemplated that the first connection assembly 66 may include pneumatic connectors and product connectors and the second connection assembly 72 may include electrical connectors and hydraulic connectors, in alternative embodiments of the invention. In yet other embodiments of the invention, the first and second connection assemblies 66, 72 may each independently include of the above described connectors or other types of connectors.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A boom center section for an agricultural machine comprising:
    a bulkhead having a first end, a second end, a front wall and a rear wall;
    at least a first bulkhead opening located adjacent at least one of the first and the second ends of the bulkhead, and at least a second bulkhead opening to the other of the first and the second ends of the bulkhead;
    a first perimeter wall forming a first tubular member and a second perimeter wall forming a second tubular member, each of the first and the second perimeter walls positioned within the front wall within the at least first bulkhead opening and the at least second bulkhead opening, respectively, the first and the second perimeter walls extending a distance toward the rear wall and configured to form an open cavity between the front wall and the rear wall of the bulkhead;
    each of the first tubular member and the second tubular member containing, respectively, a connection assembly which contains a plate perpendicular to the perimeter wall, and the plate being recessed from the front wall and having a plurality of connections, wherein the plurality of connectors extend from their respective plate to the front wall; and
    the rear wall of the bulkhead positioned against both of the first and the second perimeter walls, a plurality of openings formed in the rear wall adjacent to the first perimeter wall and the second perimeter wall and configured to align with the plurality of connectors of each respective connection assembly, wherein each connector of the plurality of connectors also respectively extend from their respective plate through a space formed by the cavity and through their respective plurality of openings in the rear wall.

2. The boom center section of claim 1 wherein the at least first bulkhead opening is located in a first portion of the bulkhead adjacent the first end of the bulkhead; and
    the at least second bulkhead opening is located in a second portion of the bulkhead adjacent the second end of the bulkhead.

3. The boom center section of claim 1 wherein the plurality of connectors of each connection assembly includes at least one of a hydraulic connector, a electrical connector, a pneumatic connector, and a product connector.

4. The boom center section of claim 1 wherein the plurality of connectors includes quick connect fittings.

5. The boom center section of claim 1 wherein at least a portion of each connector of the plurality of connectors of each connector assembly is positioned to extend a distance away from the back wall.

6. The boom center section of claim 1 wherein a rear wall of the bulkhead is coupled to the agricultural sprayer by way of a plurality of lift arms.

* * * * *